US009619310B2

(12) United States Patent
El-Wailly et al.

(10) Patent No.: US 9,619,310 B2
(45) Date of Patent: Apr. 11, 2017

(54) HIGH SPEED DATA TRANSMISSION METHODS AND SYSTEMS UPON ERROR DETECTION

(71) Applicant: HONEYWELL INTERNATIONAL INC., Morristown, NJ (US)

(72) Inventors: Tamim El-Wailly, Peoria, AZ (US); Rodell Agdinaoay, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 1233 days.

(21) Appl. No.: 13/627,600

(22) Filed: Sep. 26, 2012

(65) Prior Publication Data
US 2016/0156431 A1 Jun. 2, 2016

(51) Int. Cl.
G06F 11/00 (2006.01)
G06F 11/07 (2006.01)
H04L 1/00 (2006.01)

(52) U.S. Cl.
CPC ...... *G06F 11/0709* (2013.01); *G06F 11/0703* (2013.01); *G06F 11/0739* (2013.01); *H04L 1/004* (2013.01); *H04L 1/0041* (2013.01); *H04L 1/0061* (2013.01); *H04L 1/0078* (2013.01)

(58) Field of Classification Search
CPC .. G06F 11/07; G06F 11/0703; G06F 11/0709; G06F 11/0739; G06F 11/0745; G06F 11/3041; G06F 11/3051; H04L 1/0061; H04L 1/004; H04L 1/0041; H04L 1/0078
USPC .................... 714/48, 4.1, 4.5, 25, 30, 43, 56
See application file for complete search history.

(56) References Cited

U.S. PATENT DOCUMENTS

| 5,361,005 | A | 11/1994 | Slattery et al. |
| 5,533,034 | A | 7/1996 | Kuwata et al. |
| 5,726,541 | A * | 3/1998 | Glenn .................. B60L 3/12 318/16 |
| 5,834,949 | A * | 11/1998 | Oba .................... H04L 25/028 326/16 |
| 6,223,309 | B1 | 4/2001 | Dixon et al. |
| 6,415,342 | B1 | 7/2002 | Wahl et al. |
| 6,650,149 | B1 | 11/2003 | Wong |
| 8,219,730 | B2 | 7/2012 | Barrenscheen et al. |
| 2002/0002647 | A1* | 1/2002 | Barrenschen ......... H04L 12/417 710/124 |
| 2013/0253859 | A1* | 9/2013 | Freeman ............ G05B 23/0205 702/58 |

OTHER PUBLICATIONS

Reorda M. S., et al: "On-Line Analysis and Perturbation of CAN Networks", Defect and Fault Tolerance in VLSI Systems, 2004; DFT 2004; Proceedings. 19th IEEE International Symposium on Cannes, France 10.Oct. 13, 2004, Piscataway, NJ, USA, IEEE, Oct. 10, 2004, pp. 424-432.

(Continued)

*Primary Examiner* — Joseph D Manoskey
(74) *Attorney, Agent, or Firm* — Lorenz & Kopf, LLP

(57) ABSTRACT

Systems and methods are described for reliably transmitting data in a network. The method includes: performing by a module, monitoring data from an output drive module for errors; and when an error is detected, generating a first signal based on the monitoring, and adjusting an input voltage to at least one of a pull-up resistor and a pull-down resistor for a predetermined time based on the first signal, to emphasize the error.

18 Claims, 3 Drawing Sheets

(56) References Cited

OTHER PUBLICATIONS

EP Search Report for application No. EP 13 176 225.4 dated Oct. 2, 2013.
EP Exam Report for application No. EP 13 176 225.4 dated Oct. 16, 2013.
EP Examination Report for Application No. 13176225.4 dated Oct. 2, 2014.
EP examination for Application No. 13176225.4-1860 dated Sep. 9, 2015.

* cited by examiner

HIGH SPEED DATA TRANSMISSION METHODS AND SYSTEMS UPON ERROR DETECTION

STATEMENT REGARDING FEDERALLY SPONSORED RESEARCH OR DEVELOPMENT

This invention was made with U.S. Government support under Contract No. NNJ06TA25C. The government has certain rights in this invention.

TECHNICAL FIELD

The present disclosure generally relates to data transmission, and more particularly relates to methods and systems for transmitting data over a communications network upon detection of an error.

BACKGROUND

High speed network interface cards monitor high speed data packets transmitted between peripheral devices. This monitoring detects errors in any particular data packet. However, in some cases the error may be undetected. In high integrity systems such as in an aircraft, the accuracy of the data transmission is crucial to ensuring proper operation of the aircraft. For example, if transmitted data containing errors is determined to be error free by a receiver, operation of the aircraft can be detrimentally affected by relying on the data containing errors.

Hence, there is a need for systems and methods for providing methods and systems that monitor and transmit data such that errors can be readily detected. Other desirable features and characteristics will become apparent from the subsequent detailed description and the appended claims, taken in conjunction with the accompanying drawings and this background of the invention.

BRIEF SUMMARY

According to various exemplary embodiments, systems and methods are described for reliably transmitting data in a network. In one embodiment, a method is provided for reliably transmitting data in a network. The method includes: performing by a module, monitoring data from an output drive module for errors; and when an error is detected, generating a first signal based on the monitoring, and adjusting an input voltage to at least one of a pull-up resistor and a pull-down resistor for a predetermined time based on the first signal, to emphasize the error.

In another embodiment, a system is provided for reliably transmitting data in a network. The system includes network interface card that includes a monitoring module. The monitoring module monitors data from an output drive module for errors, and when an error is detected, generates a first signal based on the monitoring, and adjusts an input voltage to at least one of a pull-up resistor and a pull-down resistor for a predetermined time based on the first signal, to emphasize the error.

In still another embodiment, a computer program product is provided for reliably transmitting data in a network. The computer program product includes a tangible storage medium readable by a processing circuit and storing instructions for execution by the processing circuit for performing a method. The method includes monitoring data from an output drive module for errors; when an error is detected, generating a first signal based on the monitoring, and adjusting an input voltage to at least one of a pull-up resistor and a pull-down resistor for a predetermined time based on the first signal, to emphasize the error.

Furthermore, other desirable features and characteristics of the method and system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following figures, wherein like numerals denote like elements, and wherein.

DETAILED DESCRIPTION

The following detailed description is merely exemplary in nature and is not intended to limit the disclosure or the application and uses of the disclosure. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

As used herein, the term "module" refers to any hardware, software, firmware, electronic control component, processing logic, and/or processor device, individually or in any combination, including, without limitation: an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
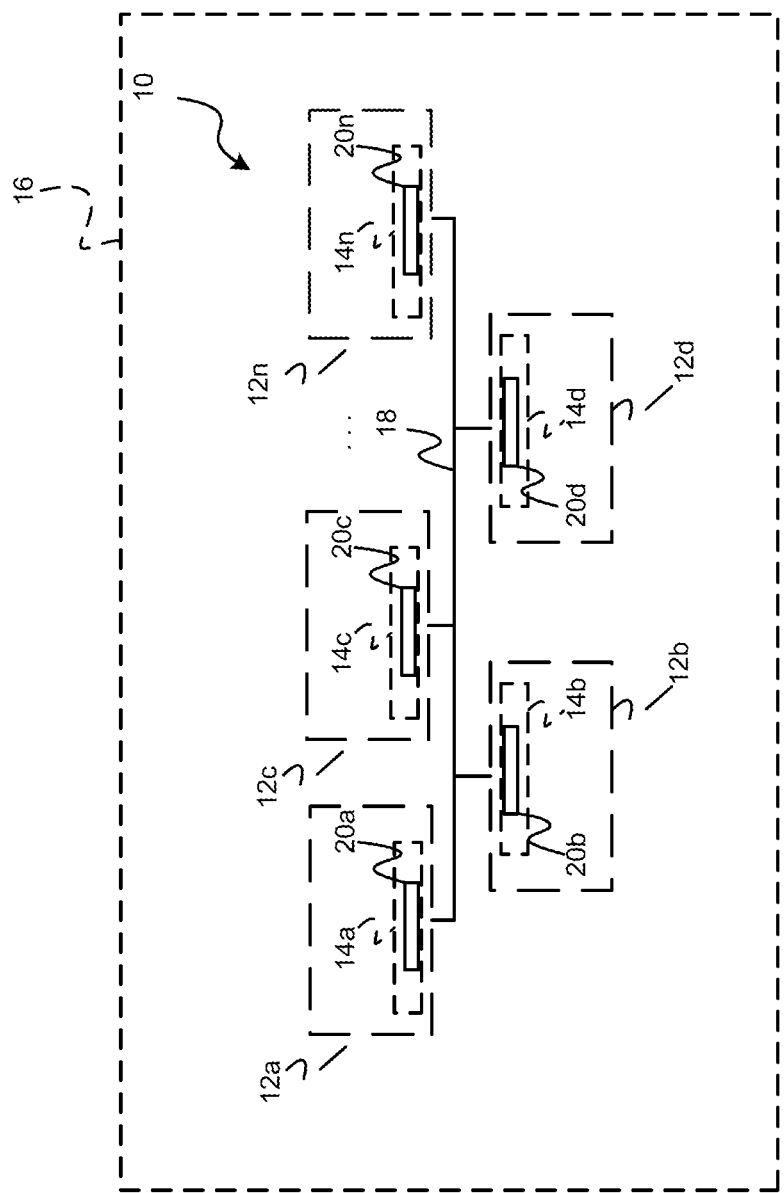
FIG. 1 is a diagram illustrating a network of devices that includes data transmission methods and systems in accordance with exemplary embodiments.

Turning now to the figures and with initial reference to FIG. 1, an exemplary network 10 for providing communications between one or more devices 12a-12n through one or more network interface cards 14a-14n is shown to include a data transmission system in accordance with various embodiments. In the various embodiments shown, the devices 12a-12n include any devices of a system 16. As can be appreciated, the data transmission methods and systems of the present disclosure may be applicable to various devices of various systems and is not limited to the present example. Although the figures shown herein depict an example with certain arrangements of elements, additional intervening elements, devices, features, or components may be present in actual embodiments. It should also be understood that FIG. 1 is merely illustrative and may not be drawn to scale.

Each device 12a-12n of the exemplary network 10 may be a fixed or a mobile device that communicates data according to one or more networking protocols. The data is communicated from one device 12*a*-12*n* to another device 12*a*-12*n* through a communication bus 18. The communication bus 18 can be serial communication bus that is wired, wireless, or a combination thereof.

Figure 2:
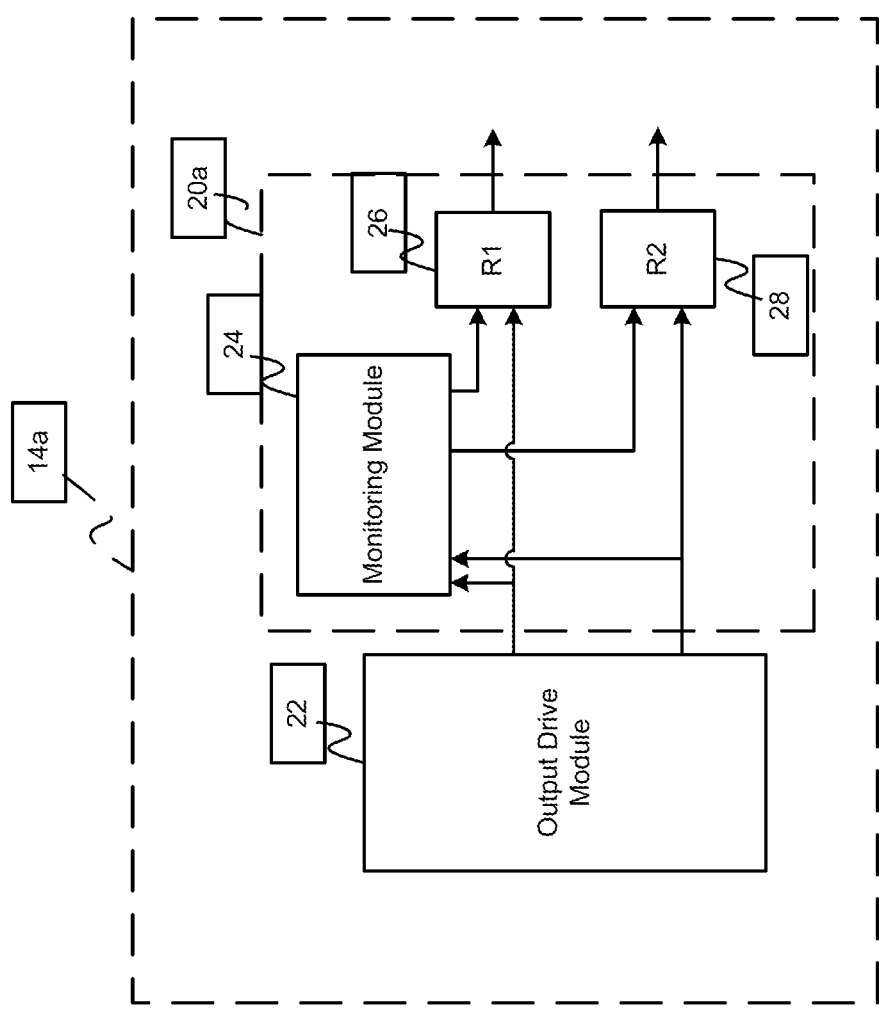
FIG. 2 is block diagram illustrating data transmission systems of the network in accordance with exemplary embodiments.

The network interface cards 14*a*-14*n* of the devices 12*a*-12*n* each includes a data transmission module 20*a*-20*n* in accordance with exemplary embodiments. Each data transmission module 20*a*-20*n* transmits data according to a reliable protocol using one or more transmission methods. In various embodiments, as shown in the more detailed FIG. 2 illustrating one of the data transmission modules 20*a*, the data transmission module 20*a* is associated with an output drive module 22 of the network interface card 14*a*. The data transmission module 20*a* includes a monitoring sub-module 24 and one or more external pull-up and/or pull-down resistors 26, 28. In various embodiments, the monitoring module 24 monitors output data to be transmitted from the output drive module 22 for errors and forces data to be transmitted to an error state using the pull-up/pull-down resistors 26, 28 when an error is detected.

More specifically, with continued reference to FIG. 2, the external resistors 26, 28 are pulled up or pulled down to an appropriate supply voltage to deliver the logic levels for the transmitted data. When an error is detected, the monitoring module 24 outputs a signal to the pull-up/pull-down resistors 26, 28 defined as a KILL signal. The signal is then the control voltage to the interruption of the data. For example, under normal operation with no errors in the data transmitted, the KILL signal is inactive and the voltage is available to the resistors 26, 28 at the output of the drive module 22. When an error is detected, the KILL signal is activated and the voltage is switched to a different value at the resistors 26, 28. The change in voltage ensures that the data is further corrupted and a receiver check (e.g., a cyclic redundancy check (CRC) check, a protocol check, or any other type of check) fails.

Figure 3:
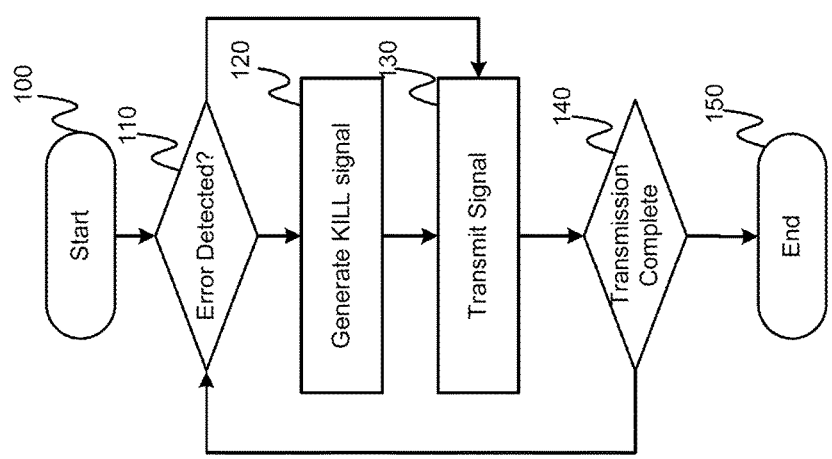
FIG. 3 is a flowchart illustrating data transmission methods in accordance with exemplary embodiments.

Referring now to FIG. 3, and with continued reference to FIGS. 1-2, a flowchart illustrates a data transmission method that can be performed by the data transmission module 38 of FIGS. 1 and 2 in accordance with the present disclosure. As can be appreciated in light of the disclosure, the order of operation within the methods is not limited to the sequential execution as illustrated in FIG. 3, but may be performed in one or more varying orders as applicable and in accordance with the present disclosure.

As can be appreciated, the data transmission method may be scheduled to run based on predetermined events (e.g., when data is to be transmitted), and/or can run continually at predetermined intervals during operation of the device 12*a*-12*n*.

The method may begin at 100. It is determined whether an error has been detected (e.g., by comparing the data as it goes out bit by bit) at 110. If an error is not detected, the signal for the data is transmitted at 130. If, at 110, an error has been detected, a KILL signal is generated (e.g., for a predetermined time during the transmission process or until the transmission of the data is complete) at 120. Based on the KILL signal, the resistor is forced to an error state (e.g., to a HIGH position or a LOW position) for the predetermined time and the signal is transmitted. The resistor then causes invalid bits to be transmitted for the predetermined time at 130. Thus, the error is emphasized in the transmitted data such that it will be readily identifiable by the receiver. Thereafter, it is determined whether the data transmission (e.g., the entire packet has been transmitted) is complete at 140. If the data transmission is not complete at 140, the method continues with monitoring to determine an error has been detected at 110. If the data transmission is complete at 140. The method may end at 150.

As can be appreciated, one or more aspects of the present disclosure can be included in an article of manufacture (e.g., one or more computer program products) having, for instance, computer usable media. The media has embodied therein, for instance, computer readable program code means for providing and facilitating the capabilities of the present disclosure. The article of manufacture can be included as a part of a computer system or provided separately.

Additionally, at least one program storage device readable by a machine, tangibly embodying at least one program of instructions executable by the machine to perform the capabilities of the present disclosure can be provided.

While at least one example embodiment has been presented in the foregoing detailed description of the invention, it should be appreciated that a vast number of equivalent variations exist. It should also be appreciated that the embodiments described above are only examples, and are not intended to limit the scope, applicability, or configuration of the invention in any way. Rather, the foregoing detailed description will provide those skilled in the art with a convenient road map for implementing various examples of the invention. It should be understood that various changes may be made in the function and arrangement of elements described in an example embodiment without departing from the scope of the invention as set forth in the appended claims and their legal equivalents.

What is claimed is:

1. A method of reliably transmitting data in a network, comprising:
    performing by a module,
        monitoring data from an output drive module for errors before the data is to be transmitted on a communication bus; and
        when an error is detected, generating a first signal based on the monitoring, and adjusting an input voltage to at least one of a pull-up resistor and a pull-down resistor for a predetermined time based on the first signal, to emphasize the error.

2. The method of claim 1 wherein the monitoring the data of the output drive module comprises monitoring data of a data packet bit by bit.

3. The method of claim 1 wherein the predetermined time includes a time to complete the remainder of the transmission of the data.

4. The method of claim 1 wherein the adjusting the input voltage is to the pull-up resistor that is external to the output drive module.

5. The method of claim 4 wherein the adjusting the input voltage is further to the pull-down resistor that is external to the output drive module.

6. The method of claim 1 wherein the adjusting the input voltage is to the pull-down resistor that is external to the output drive module.

7. A system for reliably transmitting data, comprising:
    an output drive module; and
    a monitoring module that monitors data from the output drive module for errors before the data is to be transmitted on a communication bus, and that when an error is detected, generates a first signal based on the monitoring, and adjusts an input voltage to at least one of a pull-up resistor and a pull-down resistor for a predetermined time based on the first signal, to emphasize the error.

8. The system of claim 7 wherein the monitoring module monitors the data of a data packet bit by bit.

9. The system of claim 7 wherein the predetermined time includes a time to complete the remainder of the transmission of the data.

10. The system of claim 7 wherein the monitoring module adjusts the input voltage to the pull-up resistor that is external to the output drive module.

11. The system of claim 10 wherein the monitoring module adjusts the input voltage further to the pull-down resistor that is external to the output drive module.

12. The system of claim 7 wherein the monitoring module adjusts the input voltage to the pull-down resistor that is external to the output drive module.

13. A computer program product for reliably transmitting data in a network, comprising:
 a tangible storage medium readable by a processing circuit and storing instructions for execution by the processing circuit for performing a method comprising:
  monitoring data from an output drive module for errors before the data is to be transmitted on a communication bus;
  when an error is detected, generating a first signal based on the monitoring, and adjusting an input voltage to at least one of a pull-up resistor and a pull-down resistor for a predetermined time based on the first signal, to emphasize the error.

14. The computer program product of claim 13 wherein the monitoring the data of the output drive module comprises monitoring data of a data packet bit by bit.

15. The computer program product of claim 13 wherein the predetermined time includes a time to complete the remainder of the transmission of the data.

16. The computer program product of claim 13 wherein the adjusting the input voltage is to the pull-up resistor that is external to the output drive module.

17. The computer program product of claim 16 wherein the adjusting the input voltage is further to the pull-down resistor that is external to the output drive module.

18. The computer program product of claim 13 wherein the adjusting the input voltage is to the pull-down resistor that is external to the output drive module.

* * * * *